United States Patent [19]

Fröhlich

[11] Patent Number: 5,058,470
[45] Date of Patent: Oct. 22, 1991

[54] SAWING CYCLE CONTROL SYSTEM FOR AN UNDERCUT SWING SAW

[75] Inventor: Adolf Fröhlich, Altenstadt Filzingen, Fed. Rep. of Germany

[73] Assignee: Firma Dimter GmbH Maschinenfabrik, Illertissen, Fed. Rep. of Germany

[21] Appl. No.: 636,024

[22] Filed: Jan. 4, 1991

Related U.S. Application Data

[63] Continuation of Ser. No. 340,990, Apr. 20, 1989, abandoned.

[30] Foreign Application Priority Data

Apr. 21, 1988 [DE] Fed. Rep. of Germany ....... 3813896

[51] Int. Cl.[5] .............................................. B27B 7/00
[52] U.S. Cl. ........................................ 83/72; 83/324; 83/490; 83/602; 83/617
[58] Field of Search .................. 83/490, 590, 617, 599, 83/602, 311, 72, 74, 324, 639.1, 601, 605, 607, 592, 581

[56] References Cited

U.S. PATENT DOCUMENTS

| 3,779,115 | 12/1973 | Talbert | 83/602 X |
| 3,910,142 | 10/1975 | Jureit et al. | 83/74 |
| 4,031,788 | 6/1977 | Boge et al. | 83/490 X |
| 4,618,391 | 10/1986 | Torti et al. | 83/74 X |
| 4,700,597 | 10/1987 | Taguchi | 83/74 X |

Primary Examiner—Mark Rosenbaum
Assistant Examiner—Kenneth Peterson
Attorney, Agent, or Firm—Nils H. Ljungman & Associates

[57] ABSTRACT

Hydraulic sawing cycle control system for an undercut swing saw. Hydromotor 5 with crankshaft 7 fitted thereon without play drives the sawing lever arm 2 via a connecting rod 3. One revolution of the hydromotor corresponds to one saw cut. The hydromotor 5 is thereby controlled via a proportional valve. The path of movement of the sawing cycle can advantageously be regulated.

9 Claims, 2 Drawing Sheets

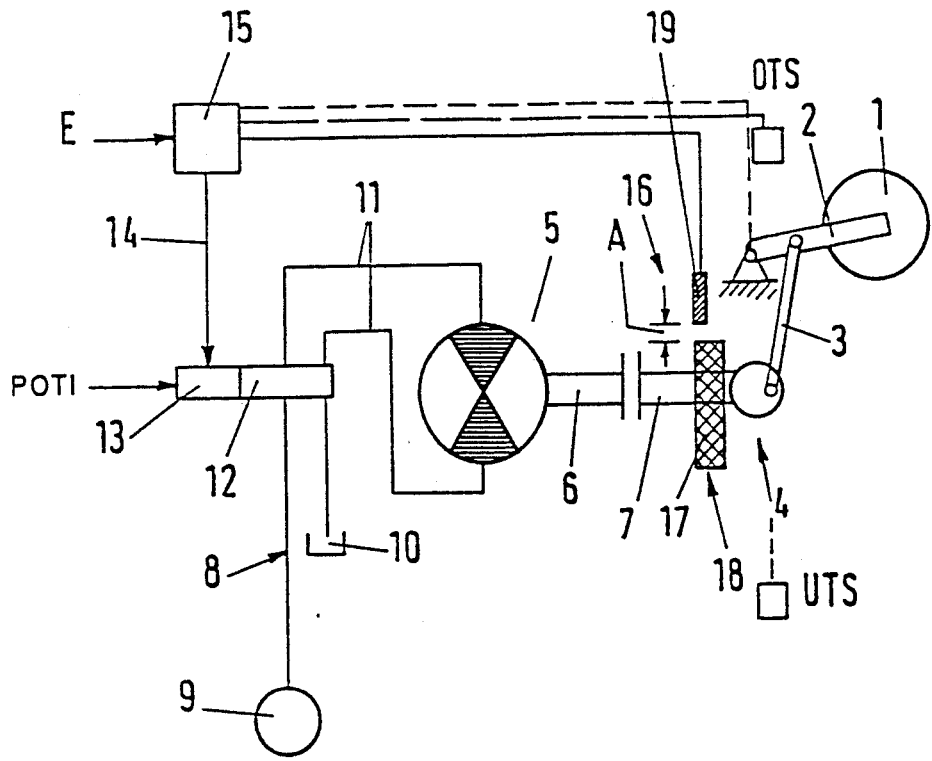
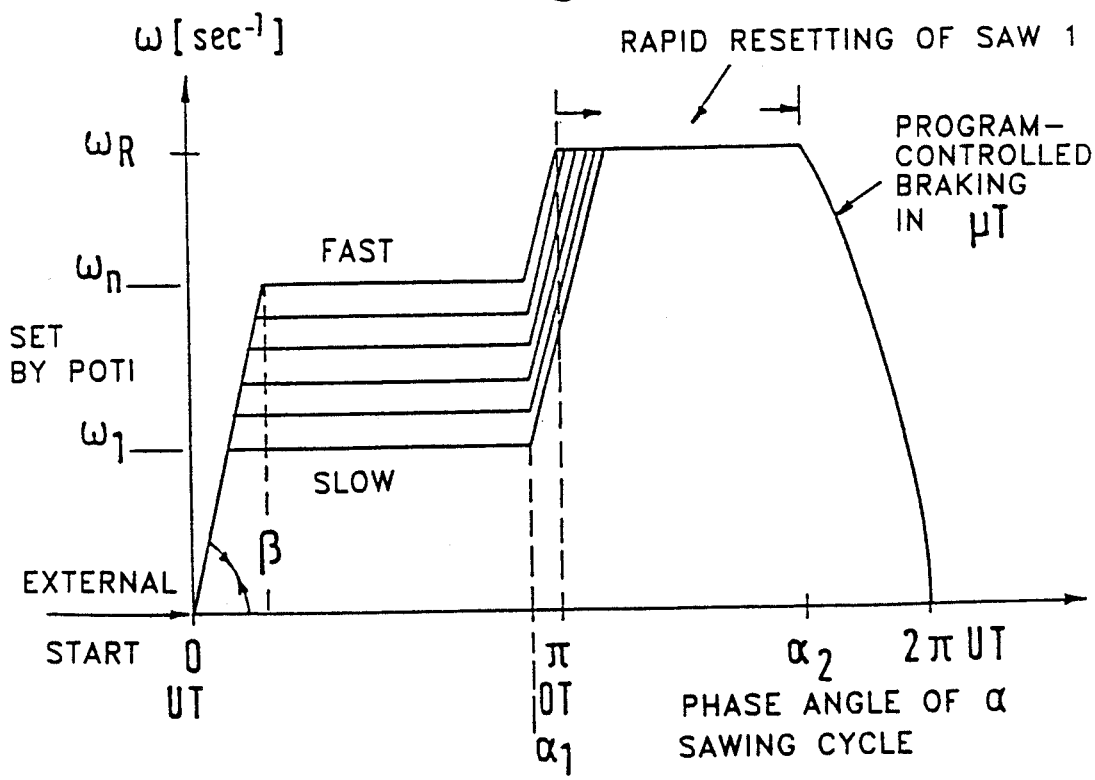

SAWING CYCLE CONTROL SYSTEM FOR AN UNDERCUT SWING SAW

This application is a continuation of U.S. application Ser. No. 07/340,990, filed on Apr. 20, 1989, now abandoned.

BACKGROUND OF THE INVENTION

1. Field of the Invention

The invention relates to a sawing cycle control system for an undercut swing saw according to the preamble of Patent claim 1.

2. Description of the Prior Art

Two sawing cycle control systems for undercut swing saws are described in a company prospectus of Messrs. Precision Product Co., 28380 Stone Road, Boring, Oreg. 97009 U.S.A. In one control system the saw blade is mounted on a lever arm and swivelled out from the table by means of a pneumatic cylinder. The sawing cycle within which the saw is moved up and down and which determines the cutting time takes about 0.5 sec.

It is frequently desired to make this time substantially shorter. However if the cutting time is shortened in this sawing cycle control system, problems arise regarding the mass forces which occur and these problems can only be curbed by very expensive measures, if at all.

With the second sawing cycle control system the movement of the swing saw is brought about by a crank gear mechanism which moves the swing up and down via a connecting rod. The crank gear mechanism is driven either by an electromotor or by the saw motor. A sinusoidal acceleration and braking path is produced: however couplings are required. Even if an electromagnetic coupling is used the switching time required has proved disadvantageous. Further problems have also arisen through the switching frequency and accurate stopping required. A particular disadvantage of this known sawing cycle control system is that the resulting movement cannot be adjusted or regulated.

OBJECT OF THE INVENTION

The invention is based on the problem of providing a sawing cycle control system for an undercut swing saw of the kind described at the beginning wherein both the sawing frequency can be adjusted in a wide range and the path of movement within a cycle can be adjusted in a predetermined desired manner.

SUMMARY OF THE INVENTION

This is achieved through the technical instruction of Patent claim 1.

It is particularly advantageous if the shaft of the hydromotor is connected in direct keyed engagement with the shaft of the crank gear mechanism. In particular the two shafts are wedged together. Through this coupling of the hydromotor with the shaft of the crank gear mechanism, the said crank gear mechanism automatically turns as the hydromotor rotates. The saw is thereby completely extended out from its lower dead center position and returned back to the lower dead center position. Advantageously the angular velocity of the hydromotor is controlled by controlling the supply of compressed medium in dependence on the phase angle of the sawing cycle. Through the invention it becomes possible to use governable hydraulic control means to control both the sawing frequency and the path of movement so that the cutting speed can be easily adapted to both the wood cross-section and the type of wood. At the same time the saw blade is lowered with the maximum possible speed. The mass forces which occur can be optimally curbed and the wear and noise reduced to a minimum. Stroke times of the saw in the range from about 0.2 to 0.15 sec. per cut are possible.

Before starting the sawing cycle, which is preferably triggered from outside, the supply of compressed medium and thus the angular velocity of the hydromotor are advantageously set to a predetermined fixed value so that the sawing speed can be set to slow or quick as required. Rising up to this fixed value can likewise be carried out with a predetermined acceleration, if there is the possibility of determining the switching time—the time between the start and reaching the desired fixed value. This fixed value, is the set angular velocity of the hydromotor, is maintained at the maximum up to reaching the upper dead center which corresponds to the phase angle $\pi$. However it is particularly advantageous if this fixed value is only maintained until just before reaching the upper dead center (phase angle $\pi$). Then it is changed over to a predetermined higher fixed value so that the hydromotor runs at a higher angular velocity from now on and the saw moves down with a greater motion. This fast downward speed is maintained until a predetermined phase angle between the upper and lower dead centers. Then there is a switch-over to a program control and program-controlled the supply of compressed medium and thus the angular velocity are reduced to zero, is the falling movement is braked.

In a particularly advantageous design of this sawing cycle control system, a proportional route valve with electric position regulator is switched into the compressed medium supply line of the hydromotor. The electric position regulator has an external input for setting the angular velocity of the hydromotor and a control input which is connected to an electronic control unit to which two dead center switches and a program control are connected.

With the proportional route valve the hydromotor is controlled according to a programmed operating cycle. The external input of the electronic position regulator is advantageously connected to a potentiometer, which when adjusted determines the angular velocity which the hydromotor goes up to after the start of the cycle. The acceleration is set in the electronic control unit.

The two dead center switches can be mounted at any points of the entire gear mechanism where the upper and lower dead center position of the saw blade can be clearly detected. By way of example, these dead center switches can be designed as end switches or can be cam-controlled switches. At the latest on reaching the upper dead center point, is the phase angle $\pi$, the switch for the upper dead center switches the angular velocity of the hydromotor over to the higher fixed value set in the electronic control. Advantageously this switchover has already occurred at a phase angle just before $\pi$. This switch-over can be carried out through a corresponding adjustment of the upper dead center switch or also through the program control. After the cut, the saw blade is then drawn back at a higher speed conditioned by the higher angular velocity. On reaching a predetermined phase angle in this return stroke range the supply of compressed medium and thus the angular velocity of the hydromotor are returned to zero in predetermined manner. This braking and stopping cycle is terminated at the phase angle $2\pi$ and triggers the lower dead center switch which switches the electronic circuit back to the starting conditions. An interchangeable cam plate is provided on the crank shaft for the program control, particularly in the phase angle range ($\pi \ldots 2\pi$). The angular position of this cam plate on the crankshaft is adjustable. The program control takes place through the control edge of the cam plate which is opposite an inductive route sensor. The distance between the control edge and the route sensor varies in a programmed way as the crank shaft rotates. A control voltage supplied to the electronic control unit is thereby induced by means of which the braking phase of the hydromotor is regulated.

One aspect of the invention resides broadly in a sawing cycle control system for an undercut swing saw which is connected to a lever arm which is in driving connection with a connecting rod of a crank gear mechanism, characterized in that the shaft 6 of a hydromotor 5 is connected in direct keyed engagement with the shaft 7 of the crank gear mechanism 4 and the angular velocity $\omega$ of the hydromotor 5 is controlled by regulating its supply of compressed medium in dependence on the phase angle of the sawing cycle ($0=$lower dead center $-\pi=$upper dead center $-2\pi=$lower dead center).

Another aspect of the invention resides broadly in a control system for an undercutting saw and the like including: frame device for supporting the saw: lever device which is connected to the saw and is movably connected to the frame device for altering the position of the saw relative to the frame device; motor apparatus connected to the saw for rotating the saw at a preselected angular velocity; and control apparatus connected to the lever device and the motor apparatus which receives data regarding the relative position of the saw with respect to the frame device and which adjusts the preselected angular velocity of the saw in relation to the data regarding the relative position of the saw with respect to the frame device.

BRIEF DESCRIPTION OF THE DRAWINGS

An embodiment of the invention will now be explained with reference to the drawings in which:

FIG. 3 is a diagrammatic circuit diagram of the sawing cycle control system; and FIG. 4 is a graphic illustration of the controlled sawing cycle.

DESCRIPTION OF THE PREFERRED EMBODIMENT

Figure 1:
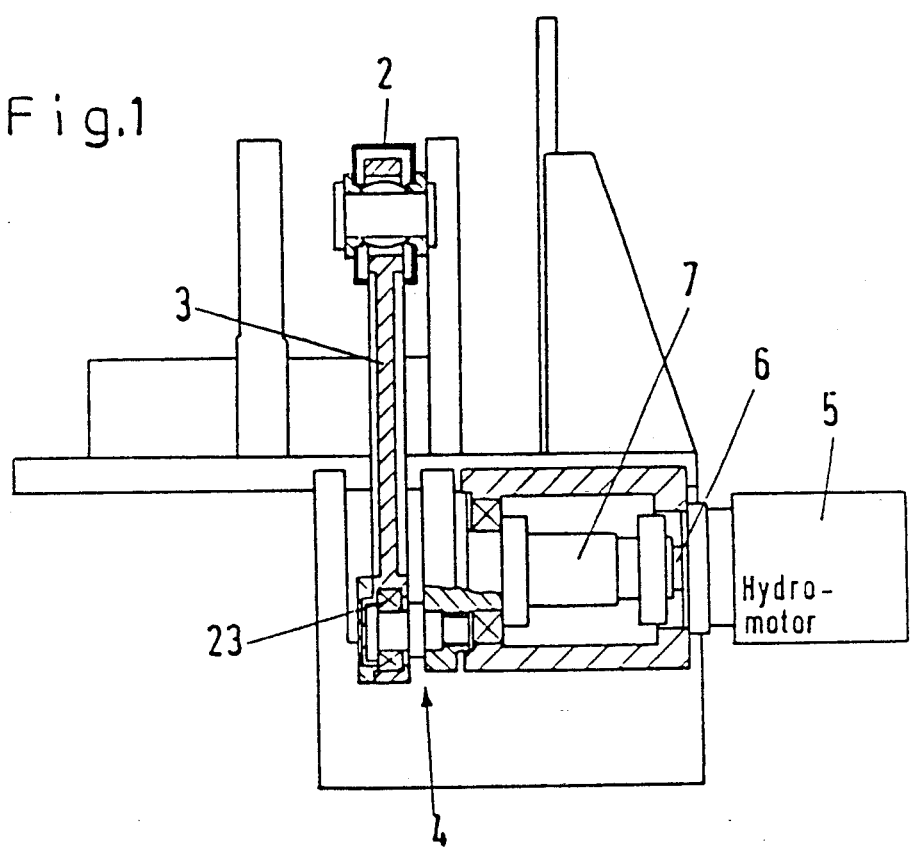
FIG. 1 is a diagrammatic side view, partly in section.
Figure 2:
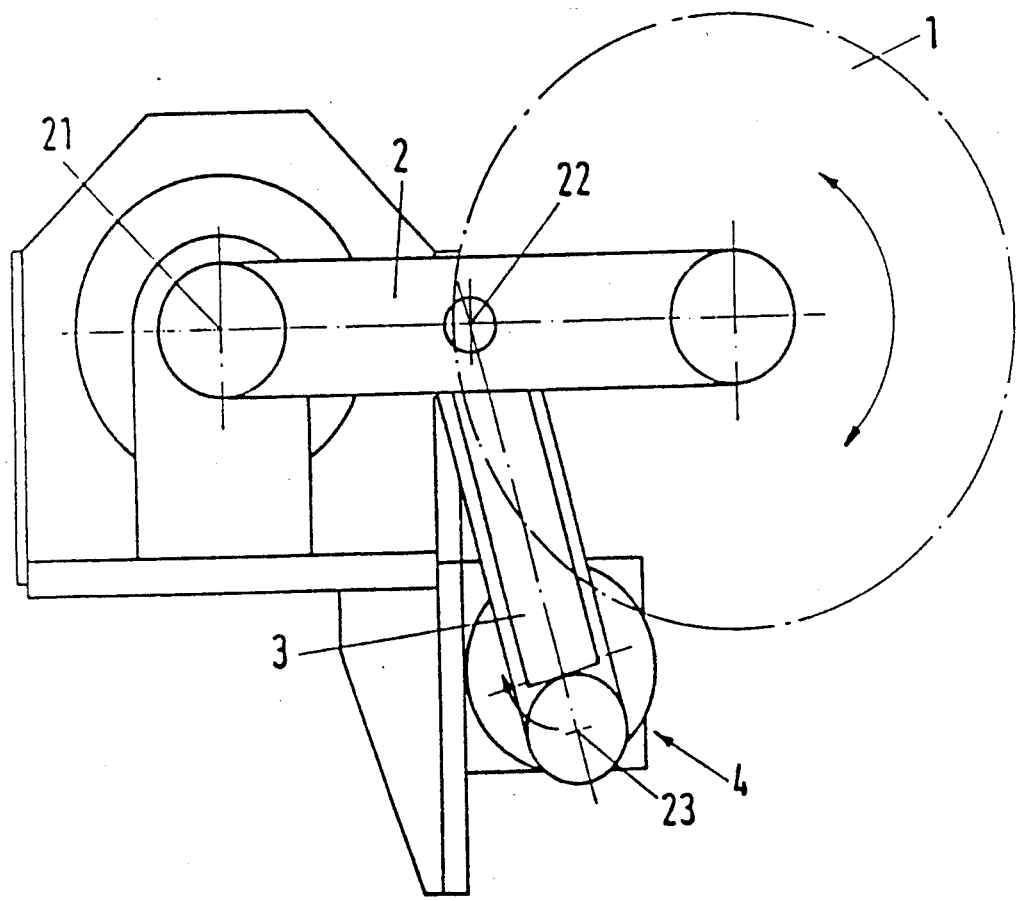
FIG. 2 a front view of a crank drive of an undercut swing saw.

As can be seen in FIGS. 1 and 2, an undercut swing saw 1 which is driven by a motor (not shown) is mounted on a lever arm 2 which swivels about the swivel axis 21. A connecting rod 3 is connected to the lever arm 2 at 22 between the rotary shaft of the swing saw 1 and the swivel axis 21. The connecting rod 3 is driven by the crank pin 23 of a crank gear mechanism 4. The crank gear shaft 7 of the-crank gear mechanism 4 is connected in keyed engagement with the shaft 6 of the hydromotor 5. The hydromotor 5 with the crank shaft 7 fitted thereon without play drives the saw lever arm 2 via the connecting rod 3. Rotation of the hydromotor 5 automatically produces a complete rotation of the crank gear mechanism 4 from the lower dead center position through the upper dead center position and back to the lower dead center again and thus corresponds to a saw cut.

As shown in FIG. 3, the drive of the hydromotor 5 is produced by a compressed medium which is conveyed through the pump 9. A proportional route valve 12 with electric position regulator 13 is inserted into the compressed medium supply line 8. Such proportional route valves serve to control the angular velocity and direction of movement of the hydromotors. Controlling the angular velocity and direction can be carried out by these according to programmed operating cycles. The proportional route valve 12 regulates the supply of compressed medium to the hydromotor 5 and its exit to the sump 10 via the compressed medium pipes 11. The electric position regulator 13 has an external input which is marked by Poti. This input is connected to a potentiometer by which the desired angular velocity of the hydromotor 5 is set. According to the setting of this potentiometer, the hydromotor 5 can turn with a low or high angular velocity depending on whether the sawing cycle is to be carried out fast or slow.

The electric position regulator 13 has a second input 14 which is connected to an electronic control 15. This electronic control 15 has an outer setting input marked E. In particular this can be used to set the rotating speed at which the hydromotor 5 runs as the saw blade 1 moves downwards. Through E a fixed value is selectively introduced into the electronic control 15 which, switched on, sets the proportional route valve 12 to a larger opening than that set by the potentiometer.

Furthermore, through E the speed can be set at which the proportional route valve 12 is set to the predetermined fixed value.

The electronic control system 15 has two further inputs which are connected to the upper dead center switch OTS and the lower dead center switch UTS.

The two switches UTS and OTS are diagrammatically illustrated in FIG. 3.

It should thus be pointed out that there are various possibilities for designing and mounting these two switches so that they switch at the upper and lower dead center of the cycle. By way of example the shaft 7 can be provided with cams which operate these switches. These switches can however also be limit switches mounted in the swivel area of the lever arm 2. The switches can be cam switches or inductive initiators.

For the program control, particularly braking, a cam plate 17 is mounted on the shaft 7. The angular position of this cam plate and the shape of the control edge 18 can be selected according to requirements. An inductive route sensor 19 is mounted at a distance A in the peripheral area of the control edge 18. As the crank shaft 7 turns, this distance A between the control edge 18 and inductive route sensor 19 alters in a predetermined way. A control voltage is thereby induced which is processed in the electronic control 15 in order to send command signals to the electric position regulator 13 via the input 14.

A diagram of the sawing cycle is illustrated in FIG. 4. The angular position of the crank gear mechanism, is the phase angle $\alpha$ of the sawing cycle, is plotted on the abscissa. The abscissa begins at the lower dead center of the sawing cycle which corresponds to the phase angle $\alpha=0$. The upper dead center of the sawing cycle is reached at phase angle $\pi$. The swing saw blade 1 is thereby located at the end of the cutting process. Resetting now begins for the saw blade 1 and this extends to the phase angle $2\pi$ at which the lower dead center of the crank gear mechanism is again reached.

As shown in FIG. 4, the hydromotor 5 can be set to n-values anywhere in an area between a lower speed $\omega_1$, and an upper speed $\omega_n$. These values are shown in FIG. 4 by horizontal lines wherein the lower line is designated "slow" and the upper line "fast". Selecting one of these values for the hydromotor 5 is undertaken by the potentiometer Poti diagrammatically shown in FIG. 3.

The angle $\beta$ shown in FIG. 4 represents the acceleration with which the rotational speed of the hydromotor 5 is reached. This angle $\beta$ can be set by the input E (FIG. 3). As shown diagrammatically in FIG. 4, the start is triggered externally. Once the start has been triggered, the hydromotor 5 runs up to the set speed value $\omega$ and remains at this value up to the upper dead center at the latest. The switch-over preferably takes place at angle $\alpha_1$, which is just before $\pi$. The switch-over is made through the upper dead center switch OTS which is then mounted correspondingly at the angle $\alpha_1$. By operating the dead center switch the proportional route valve 12 is set to the higher angular velocity $\omega_R$ through the electronic control 14 and the electric position regulator 13. This higher angular velocity $\omega_R$ causes a rapid resetting of the saw blade 1. This resetting must be braked. With the illustrated phase angle $\alpha_2$ the cam plate 17 becomes operative which controls the electronic control via the route sensor 19. Through the program contained implicitly in the alteration of the distance A, the braking illustrated diagrammatically in FIG. 4 is continued down to the angular velocity zero. At $2\pi$ the switch UTS is operated which switches the program back to the starting value.

The invention as described hereinabove in the context of a preferred embodiment is not to be taken as limited to all of the provided details thereof, since modifications and variations thereof may be made without departing from the spirit and scope of the invention.

What is claimed is:

1. Apparatus for controlling a sawing cycle of an undercut swing saw, said saw comprising,
   a lever arm having a first end portion and a second end portion,
   said lever arm first end portion rotatably supporting an undercut swing saw,
   a frame,
   said lever arm second end portion connected to said frame for angular movement of said lever arm relative to said frame,
   a hydraulic motor mounted on said frame and having a drive shaft,
   regulator means connected to said motor for rotating said drive shaft at preselected rotational speeds through preselected angles of movement of said lever arm,
   crank gear means connected to said drive shaft of said motor,
   said drive shaft being in direct engagement with said crank gear means,
   said crank gear means being directly connected to said lever arm for converting rotation of said drive shaft to angular movement of said lever arm in relation to said frame,
   a connecting rod being connected between said crank gear means and said lever arm, said connecting rod for driving said lever arm,
   control means connected to and controlling said regulator means,
   said control means comprising means for sensing the relative angular position of said lever arm with respect to said frame to change the rotational speed of said drive shaft and said crank gear means and for selectively adjusting the angular velocity of said lever arm and said crank gear means as said lever arm swings through the sawing cycle,
   said control means comprising means for setting a control value corresponding to the tangent value of an angle $\beta$,
   said control value of tangent $\beta$ corresponding to a rate of change of angular velocity of said crank gear means relative to the angular displacement of said crank gear means,
   said angular displacement of said crank gear means defining a phase angle, $\alpha$, of the sawing cycle, said phase angle being
   zero at a lower dead center position of said crank gear means,
   $\pi$ at an upper dead center position of said crank gear means, and
   $2\pi$ at the lower dead center position of said crank gear means,
   said control means comprising means for selectively maintaining said crank gear means at zero angular velocity in said lower dead center position of $\alpha=0$,
   said control means comprising means for predetermining said control value of tangent $\beta$,
   control means comprising means for changing the angular velocity of said crank gear means from zero, at $\alpha=0$ at the lower dead center position, to one of a range predetermined angular velocities ($\omega_l \ldots \omega_n$) at a rate corresponding to said control value of tangent $\beta$,
   said control means comprising means for, subsequently to the changing of the angular velocity from zero to said one of a range of predetermined angular velocities ($\omega_l \ldots \omega_n$), displacing said crank gear means at said one of a range of predetermined angular velocities ($\omega_l \ldots \omega_n$) during sawing, wherein said crank gear means rotates up to a maximum phase angle,
   said maximum phase angle being less than a total angular displacement of $\pi$ radians at the upper dead center position,
   said control means comprising means for increasing said angular velocity, subsequent to sawing, of said crank gear means to a predetermined higher angular velocity $\omega_R$, during rapid resetting of the saw, wherein said crank gear means further rotates up to a total angular displacement which is $\alpha_2$,
   said predetermined higher angular velocity $\omega_R$ being greater than any one of the velocities in the range of predetermined angular velocities ($\omega_l \ldots \omega_n$),
   said total angular displacement $\alpha_2$ being less than a total angular placement of $2\pi$ radians at the lower dead center position, and
   said control means further comprising program control means for controlling deceleration of the angular velocity of said crank gear means, program-controlled, to zero angular velocity at the end of the rapid resetting of the saw, wherein said crank gear means further rotates up to the lower dead center position, at a total angular displacement of $2\pi$ radians.

2. The apparatus according to claim 1, wherein said control means comprises:
   external input means for setting said one of a range of predetermined angular velocities ($\omega_1 \ldots \omega_n$);
   control input means;
   said control input means being connected to an electrical control unit;
   said electrical control unit comprising:
      two inputs for limit switches; and
      one input for said program control means.

3. The apparatus according to claim 1, wherein said program control means comprises:
   inductive sensor means; and
   a cam plate; and
   said cam plate comprising means for influencing said inductive sensor means.

4. The apparatus according to claim 1, wherein said control means are hydraulic control means.

5. The apparatus according to claim 2, wherein said control means comprises:
   said limit switches being an upper and a lower dead center switch;
   said lower dead center switch being disposed at the lower dead center position of said crank gear means; and
   said upper dead center switch being disposed at the upper dead center position of said crank gear means.

6. The apparatus according to claim 4, wherein said regulator means comprises:
   electronic position regulator means; and
   proportional route valve means.

7. The apparatus according to claim 6, said control means comprising:
   said motor comprising a feed pipe for the entry of compressed medium into said motor; and
   said proportional route valve means being connected to said feed pipe.

8. The apparatus according to claim 3, wherein said apparatus comprises:
   said crank gear means comprising a crank shaft; and
   said cam plate being disposed upon said crank shaft.

9. The apparatus according to claim 2, wherein said external input means comprises a potentiometer (Poti).

* * * * *

UNITED STATES PATENT AND TRADEMARK OFFICE
CERTIFICATE OF CORRECTION

PATENT NO. : 5,058,470

DATED : October 22, 1991

INVENTOR(S) : Adolf FRÖHLICH

It is certified that error appears in the above-identified patent and that said Letters Patent is hereby corrected as shown below:

In column 1, line 33, delete "produced:" and insert --produced;--.

In column 3, line 7, delete "saw:" and insert --saw;--.

Column 6, line 10:
Claim 1, line 46, delete "being" and insert --being:--.

Column 6, line 35:
Claim 1, line 60, delete "$\alpha$ = Oat" and insert --$\alpha$ = O, at--.

Signed and Sealed this

Twenty-third Day of February, 1993

*Attest:*

STEPHEN G. KUNIN

*Attesting Officer*   Acting Commissioner of Patents and Trademarks